July 28, 1936.  H. H. GEFFCKEN ET AL  2,048,740
LIGHT SENSITIVE APPARATUS
Filed Nov. 8, 1930   3 Sheets-Sheet 1

INVENTORS
H. H. Geffcken
H. R. Richter
BY Samuel Ostrolenk
ATTORNEY

July 28, 1936.  H. H. GEFFCKEN ET AL  2,048,740
LIGHT SENSITIVE APPARATUS
Filed Nov. 8, 1930   3 Sheets-Sheet 3

INVENTORS
H. H. Geffcken
H. R. Richter
BY
ATTORNEY

Patented July 28, 1936

2,048,740

UNITED STATES PATENT OFFICE

2,048,740

LIGHT SENSITIVE APPARATUS

Heinrich H. Geffcken and Hans R. Richter, Leipzig, Germany, assignors, by mesne assignments, to Radio Corporation of America, New York, N. Y., a corporation of Delaware Application November 8, 1930, Serial No. 494,240
In Germany November 9, 1929

5 Claims.  (Cl. 250—41.5)

Our invention relates to methods of and apparatus for signalling and, more particularly, for traffic control.

The development of modern street traffic has made more and more necessary the employment of automatic means, both for practical and scientific reasons. In developing such automatic means, difficulties are met with in preventing interference with the traffic. The paths of the individual vehicles are distinguished from each other by their direction, as well as their position on the road, which makes automatic control of traffic exceedingly difficult.

According to one suggestion which has been made, a pneumatic tube is disposed across the road, which, when a vehicle passes over it, operates a pressure indicating device for effecting a registration or releasing any other control apparatus. Such installations are, however, entirely prohibitive, on account of atmospheric influences, such as snow and, on the other hand, have a very short life, because of the excessive wear of the pneumatic tube. The same holds for contact rails, which have recently been proposed for the same purpose.

Accordingly, an object of our invention is to provide novel means for applying light cells for traffic control.

According to the system proposed by our invention, no interference with the traffic at all takes place and the installation is exposed to practically no wear by the traffic. Besides this, a number of further advantages are secured. According to our invention, a light beam is provided, which acts on a light sensitive organ, such as a selenium cell, photo electric cell, or the like, which operates a suitable recording or signalling device. "Light bars" of this type are no longer entirely new and have been proposed, for instance, for use in burglar alarm devices and the like.

A further object of our invention is to provide novel apparatus and method of operating same, having a considerable number of advantages and rendering automatic traffic control effective and dependable and suited for practical use.

Figure 1:
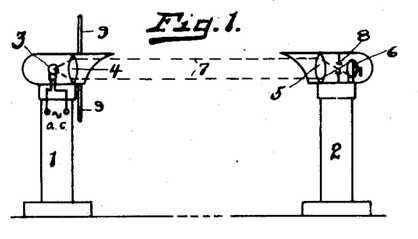
Figure 1 is a diagrammatic illustration of the main embodiment of our invention.

In Figure 1 the basic principle of our invention has been illustrated. At the right and the left side of the road, the turrets or pedestals 1 and 2 are provided. The left turret 1 carries a projector, comprising a light source 3, preferably an electric lamp and a lens system 4, for producing a light beam 7 crossing the road in a transverse direction. The right turret carries the light sensitive apparatus, comprising an optical lens system, as at 5 and a photo-electric cell 6 arranged at a suitable distance behind the lens 5, to be operated by the light beam 7.

As soon as the light beam 7 is intercepted by a vehicle passing between turrets 1 and 2, a relay arrangement, connected to the photo cells 6 and preferably mounted within the turret 2, (not shown for the sake of simplicity) starts to operate, whereby a counting device may be actuated for statistical recording of the traffic, or a warning signal produced apprising a vehicle approaching from a cross road of the approach of the vehicle passing the light bar 7.

In order to insure complete dependability of such a system, it is necessary to provide means to render it completely independent of the influence of daylight, or other interfering light, such as automobile searchlights and the like. This independence may be secured in different ways. One such way is shown in Figure 1 and will be described later.

It has already been proposed to insure independence from daylight for photo-electric devices, by providing a rotating perforated disc chopper in front of the light source, thus impressing upon the illumination a note differentiating the same from interfering light source.

In this case the light sensitive organ supplies an alternating current, on account of the intermittent illumination produced by the disc and this current may be transmitted effectively and easily, by means of transformers and condensers, to the relay device proper, preferably after amplification, in such a manner that a release of the relay is effected only when the intermittent illumination of the photo cell varies, whereas variations of the direct current component of the photo-electric output current, such as may be produced by variations of the daylight, will produce no effect.

In apparatus which have to operate for days and weeks without attendance, it becomes, of course, prohibitive to use continuously moving parts, such as a rotating chopper disc, in order to insure the necessary dependability of service. Thus, the use of intermittent illumination was not believed to be suited for apparatus of the present type. This difficulty is, however, overcome, according to the system of the present invention, by using, as operating light source, a lamp supplied with alternating current, which, by eventually using methods well known in picture transmission, such as a hydrogen filling, or the like, is designed in such a manner that its illumination is enabled to readily follow the variations of the alternating current. In this manner, it is obtained that, without the use of any moving parts, a periodic darkening of the lamp takes place at a frequency equal to the frequency of the alternating current. As is obvious, this is identical to a periodic interruption of the light beam, by means of a rotating chopping disc, as referred to above.

A further possibility for avoiding the influence of interfering light may be obtained in a purely optical manner, according to our invention. It is admitted as being old to provide lenses and the like in fron' f the photo-electric device. According to ou. invention, however, in addition, a shutter is provided, arranged at the place of the light path, at which a real image of the light source is produced, whereby the shutter closely embraces such picture. In other words, the shutter is to be arranged in the focal plane of the lens.

According to Figure 1, this shutter is shown at 8. The lens 5 produces a sharp image of the light beam in a plane known as the focal plane, in which the shutter 8 is arranged. The opening of the shutter 8 is such that it closely encircles this image of the lamp 3, or its filament. Thus, only light emanating from the source 3 will impinge on the photo-electric cell. In order to prevent the influence of interfering lights which might arise in the immediate neighborhood of the projectors 3, 4, a screen 9 is provided around the projector, as shown. By combination of these elements, furthermore, a considerable increase of the life of the photo-electric cell 6 is insured, besides increased dependability of service, in that the cell is operated exclusively by the operating source of light. The described methods may, however, produce successful operation separately, or in a combination different from the one shown.

The burning out of the lamp 3 will disable the apparatus and, of course, cannot fundamentally be avoided. Therefore, it has been found advantageous to insert an open circuit relay in the circuit of the lamp 3, which, when released, disconnects the light sensitive apparatus and, under circumstances, produces a corresponding signal in the central station, such as police station from where the traffic is supervised. In this manner, an undesired operation of the relay included in the light sensitive apparatus is avoided and, at the same time, it is insured that the source 3 is replaced with the least possible relay and service interruption confined to a minimum.

Figure 2:
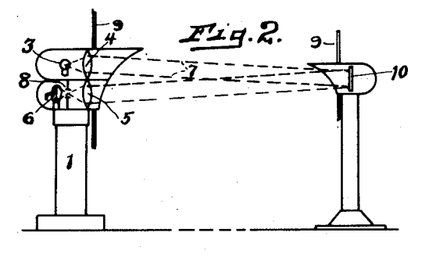
Figure 2 is a modified form of Figure 1, in which the photo-electric cell and light responsive means employed are juxtaposed to same.

When using the afore-mentioned open circuit relay, which, when actuated, disconnects the light sensitive apparatus, it is necessary to provide electrical conducting wires leading across the road to the light sensitive apparatus. In order to avoid this drawback and to simplify the entire apparatus and its installation, it has been found advantageous, in many cases, to mount the projector and the light sensitive apparatus on a single pedestal and to guide the light beam by means of reflectors, prisms, or the like. An arrangement of this kind is illustrated in Figure 2. The projectors 3, 4 and the light receivers 5, 6, 8 are mounted on the same turret, one above the other. On the opposing side of the road merely a mirror, or reflector 10 is arranged. In order to prevent the influence of interfering light arising in the immediate neighborhood, the projectors 3, 4 and also the mirror 10 are protected by annular screens 9.

The practical requirement when using such a "light bar" furthermore entails the provision of a number of special arrangements. For the purpose of traffic statistics and also of practical traffic control, primarily vehicles of all kinds, such as automobiles, are of interest. The equipment has to be such that it is actuated by such vehicles only and not by other objects, such as, for instance, by a pedestrian. This aim is obtained according to our invention, in that two light bars are placed across the road close to each other and in that the light sensitive devices operated by each one of these light bars are designed in such a manner that the desired release (operation of a recording device, or of a signalling apparatus) takes place only when both light bars are simultaneously intercepted for a short period of time between their successive interruptions by a passing vehicle. The switching arrangements necessary for such a system will be described in detail later on. At present, we shall proceed in describing the "double light bar".

It was found suitable to produce a "double light bar", not by merely disposing, at a certain distance, two similar arrangements, according to Figure 1, but it was found to be preferable, for reasons of simplicity and economy, to use a single source of light and a single light sensitive device for producing a double light beam, by utilizing reflectors, prisms and the like directing devices. A preferred form consists in that the source of light and the light sensitive organ are arranged diagonally to each other, in respect to the light beam rectangle formed by the two parallel light bars. This is illustrated in further detail by Figure 3 of the drawings. Two light bars 7 and 12 are disposed transverse to the road 11, at a certain distance from each other (about 1.5 meters). As a source of light, an electric lamp 3 may be used, transmitting its light by means of optical lenses 4 and 13 in two beams, at right angles to each other. Reflectors 14 and 15, disposed in suitable protective casings, serve to reflect the light beams upon the light sensitive receiver 6, arranged diagonally to the source 3. If the light sensitive cell 6, which is also arranged in a suitable protective casing, is connected in a suitable electric circuit, a relay device associated therewith will be released only when both light beams are simultaneously interrupted during a short period of time; that is, when a passing vehicle has a length greater than the distance of the "light bars" 7 and 12 from each other. By suitably choosing this distance, a complete selection between vehicles and pedestrians may be insured. The case that each of two pedestrians is crossing at the same moment one of the "light bars" is so unlikely to happen in practice, that it may be practically ignored as a source of interference.

Figure 3:
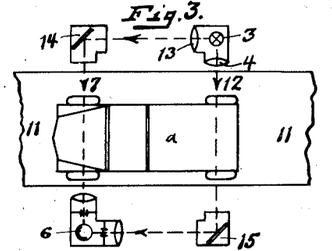
Figure 3 is a further modification, illustrating a "double light" bar.

The embodiment of a "double light bar", according to Figure 3, in which the light source and the light receiver are arranged diagonally to each other, has the basic advantage that both light beams are completely identical in respect to their optical behavior, such as length, loss by reflection, etc. The use of such "double light bar" is not restricted to the example above described, but may be employed in any other organization, as is obvious.

According to Figure 3, we have shown a single photo-electric cell 6, acting as a light receiver and operated by both of the light beams. Instead of such an arrangement, it is understood that two such light sensitive electric organs could be provided operating a relay system which will perform the desired final release only when both light sensitive organs are interrupted simultaneously. The above arrangement is, however, by far superior to such a system, because of its simplicity and on account of the fact that the light sensitive organ may be arranged in a circuit, which becomes inoperative only at complete interception of both "light bars".

Figure 4:
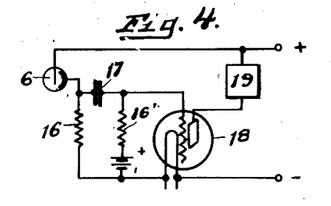
Figures 4 and 5 are circuit diagrams showing one application of our invention to counting devices.
Figure 5:
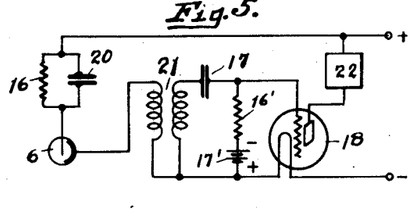

In Figures 4 and 5, we have illustrated two such electric circuits for operating the light sensitive organ 6. Figure 4 relates to a circuit in which the operating source of light (lamp 3) is supplied with alternating current, whereas the circuit, according to Figure 5, relates to direct current supply of the light source. Referring to Figure 4, the photo-electric cell 6 is connected in series with the high ohmic resistance 16 (about 2.5 megohms). The connecting mid-point is connected across a condenser 17 to the grid of a three-electrode vacuum tube 18, which is, furthermore, connected to the cathode through a high ohmic grid leak 16' and a positive grid biasing battery 17'. A closed circuit relay 19 is inserted in the anode circuit of the tube 18. Whenever the intermittent component of the operating light source acts on the photo-electric cell 6, an alternating current will flow in the circuit containing resistance 16 and this current is applied across the condenser 17 to the grid of the electron tube 18, producing a choking effect of the latter, according to the well-known manner of the audion rectification, in that the grid beomes more and more negative through the accumulation of the negative charges by the successive negative half cycle of the input current. When, however, the photo-electric cell is completely darkened, this alternating component and, accordingly, the choking effect of the tube 18, disappears, whereby the relay 19 is released, operating a counting device, a warning signal, or the like. In case that the alternating component of the photo-electric current does not suffice to completely choke the tube 18, it is preferable to first amplify the photo-electric output current, by means of one of the well-known amplifiers. As is well known, it is a great advantage to use intermittent illumination, as the resultant alternating current allows effective and easy amplification, by means of the well-known electron tube amplifiers.

Referring to the circuit according to Figure 5, the photo-electric cell is arranged in a reversed sense, in series with the resistance 16, as compared to Figure 4, which resistance, in this case, has to be much higher (about 30 to 100 megohms). A condenser 20 is placed in parallel to the resistance. The cathode of the photo-electric cell is connected to the negative pole of the current source across a transformer 21. In this case a photo-electric cell is used, filled with a rarefied inert gas of well-known composition, such as, for instance, neon. In this manner, the photo-electric cell, besides its photo-electric qualities, assumes the characteristics of a glow discharge gap, upon which the operation of this circuit is based.

By suitably choosing the voltage of the source of operating current in excess of the ignition voltage of the cell 6; that is, that voltage at which the glow discharge suddenly sets in, an ignition or discharge will not be produced, even when the cell is illuminated, as the available voltage drop is divided upon the cell 6 and the resistance 16. On the other hand, whenever the illumination of the photo-electric cell 6 is completely interrupted, the entire available drop acts on the cell 6 and the glow discharge sets in. By means of the condenser 20 placed in parallel to the resistance 16, this glow discharge assumes an intermittent character, in a manner as is well-known in the art. (See Geffcken & Richter "Die Glimmbrucke" Leipzig 1927, Dr. Stohrer & Sohn, pages 7 to 9.) The periodic glowing impulses thus produced are transmitted across the transformer 21 and condenser 17, electro-statically upon the grid of the electron tube 18, producing a choking action of same, whereby the open circuit relay 22, in series with the tube, is actuated. This connection, in the same manner as the connection according to Figure 2, will respond, provided a suitable dimensioning of all the elements, exclusively when the cell 6 is completely darkened; that is, when, in the case of two "light bars", both "light bars" are simultaneously interrupted, at least during a short period of time. This circuit has the further advantage, as compared to other arrangements, that this condition will be fulfilled even with greater variations of the operating conditions.

Figure 6:
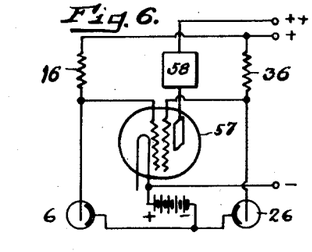
Figure 6 is a modified form of the circuit connection embodying my invention, in which two light sensitive devices are provided.

Instead of having both light beams operate a single light sensitive organ, it is obvious that two light sensitive organs may be provided. A circuit connection of this kind, which was found to give satisfactory operation, is illustrated by Figure 6. Both grids of a double grid tube 57 are connected each to the mid-point of a voltage divider, each consisting of a photo-electric cell 6 and 26 and a resistance 16 and 36, respectively. As the photo-electric cells are connected to the negative side of the voltage divider, the grids with the cells being illuminated will carry a negative potential in respect to the cathode of the tube 57 and, thus, the output is completely choked. Current can flow through the tube 57 and operate relay 58 only when both cells are simultaneously darkened. If the period of time during which this condition prevails is too short, as compared to the response period of the relay 58, an arrangement according to Figures 11 and 12, being described later on, may be used, in order to insure a complete and dependable operation of the relay 58.

Figure 7:
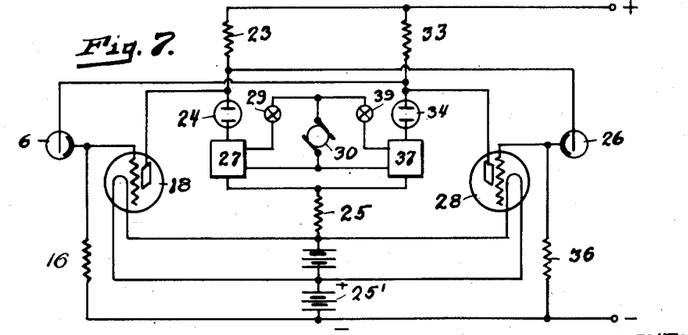
Figure 7 is a further modification of our invention, showing the circuit diagrams for counting and determining the direction of movement of devices.

The arrangements as above described are suited to solve the problem of automatic traffic statistics control, completely if traffic on the road is in one direction only. In order to utilize the principle underlying the invention, also in such cases where traffic in different directions is taking place, a "double light bar", in accordance with the invention and two light sensitive organs are used in a combined organization, to act simultaneously on a relay device, in such a manner that selective switching actions are performed, dependent on which of the light sensitive organs is darkened before the other. A number of possible embodiments to accomplish this aim will be described by the following examples, one of which is shown by Figure 7.

The photo-electric cells (6 and 26 according to Figure 7) are placed in series with resistances 16 and 36, respectively, the mid-points of the series connections being connected to the grids of the electron tubes 18 and 28, respectively. As the photo-electric cells are provided with a negative bias 25', a heavy anode current will flow through the tubes 18 and 28, respectively, when the photo-electric cells are illuminated, whereas, when the cells are darkened, the grids of the tubes 18 and 28 are charged negatively through the resistances 16 and 36, respectively, thereby choking the tubes. The electron tubes 18 and 28 are, furthermore, arranged in series with the resistances 23 and 33 respectively and are associated in parallel with glow discharge devices 24 and 34 respectively, The circuits of the glow discharge lamps 24 and 34 each comprise a relay 27 and 37, respectively, and a common series resistance 25. If, by darkening the photo-electric cell 6, the resistance of tube 18, which, together with the series resistance 23, forms a potentiometer connection, increases and, consequently, the glow discharge lamp 24, parallel to the tube, ignites, the relay 27 will be actuated. In this manner, simultaneously, the resistance 25, placed in the common negative lead to the glow discharge lamps 24 and 34, is put under current, whereby the voltage drop of this resistance acts to decrease the potential applied upon the glow discharge 34. If, therefore, the photo-electric cell 26 is darkened consecutively, the ensuing choking of the tube 26 cannot produce an ignition of the glow lamp 34, as it has been "robbed" of its voltage by the already ignited glow lamp 24, on account of the drop of the resistance 25. Therefore, the response of relay 37 cannot take place. The relays 27 and 37 may immediately perform the desired final release, such as by lighting warning lamps 29 and 39 respectively, supplied by a current source 30 being mounted, for instance, at a street crossing. The relays 27 and 37 are so constructed that when returning into their resting position they interrupt their own circuit for a short moment, thus allowing the glow discharge lamp connected in series to extinguish and return the entire apparatus in new operating condition.

It is preferable, however, to perform the final release (lighting of lamps 29 and 39) not immediately by the relays 27 and 37, but across a secondary relay with time delay action, so that the lamps 29 and 39 will remain lit for a prolonged period of time (about ½ minute), whereas the remaining apparatus is in a renewed condition for operation.

According to the afore-mentioned example, the photo-electric cells 6 and 26 control two voltage trigger or "spill-over" relays (glow discharge lamps 24 and 34) parallel to the electron tubes 18 and 28, in such a manner that the "spill-over" relay, which has first been ignited, produces a displacement of the voltage applied to the terminals of the other "spill-over" relay, rendering the latter insensitive and inoperative. This principle has been found to give very satisfactory operation. It is also possible to use the photo-electric cells 6 and 26 as "spill-over" relays themselves, whereby the circuit, according to Figure 7, is considerably amplified. As follows from Figure 7, the anodes of the photo-electric cells 6 and 26 are not directly connected to the operating voltage, but are connected to the connecting points of the resistances 23 and 33 with the electron tubes 18 and 28 respectively. This results in the following operation: Whenever the photo-electric cell 6 is darkened, a choking of the tube 18 takes place. The voltage drop of this tube will increase and, with suitable choice of the operating voltage, an ignition of the photo-electric cell 26 will set in. A consecutive darkening of the cell 26 cannot, therefore, bring about the choking of the tube 28 and this tube, therefore, remains in its open condition. When using a differential relay inserted in the anode circuits of both electron tubes, this relay will respond in one or the other sense, dependent on the succession of darkening of the photo-electric cells. The ignition of one cell, once having started, is preferably interrupted by a short interruption of the anode current, whereby the entire apparatus is put into readiness for a new operation.

When solving the problem just discussed, a considerable simplification may be obtained by an arrangement according to which a response of the relay takes place only when the double light bar is passed by a vehicle in a definite direction, whereas, with a passage in the opposite direction, no response takes place. In practice, the crossings of a main highway which it is desired to control by automatic means are at such distance from each other that only in very rare cases is it necessary to provide a single apparatus mid-way between two cross roads, responsive in both directions of traffic and, in fact, in most cases, it will be preferable to provide a single control apparatus at about 15 meters distance from a crossroad, which responds only to a direction towards such a crossroad.

Figure 8:
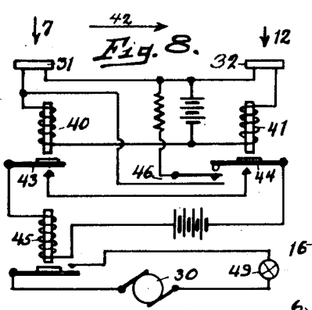
Figure 8 is a further modification, showing the circuit diagrams in which devices moving only in a pre-determined direction are counted.

We have illustrated a circuit connection for such a system in Figure 8. The light beams of the double light bars 7 and 12 act on the two photo-electric cells 31 and 32 respectively, which, in this case, may be selenium cells, which are less expensive than the photo-electric cells of the vacuum or gas filled type. The selenium cells control two relays 40 and 41, respectively. When the cells are illuminated, the relays are put under currents, whereas, with the cells becoming darkened, the resistance of the selenium increases, so that the armatures of the relays 40 and 41 are released. If a vehicle crosses the "double light bar" in a direction as indicated by the arrow 42, at first the relay 40 will be operated closing a contact 43. During the following darkening of the cell 32, the armature of the relay 41 will be released, closing its contact 44, the latter completing the circuit for a further relay 45, bringing about the desired final release, such as switching on a lamp 49 supplied from a source 30. The relay 45 may be provided with a time delay release device, in such a manner that it will again disconnect the lamp 49, after a certain time necessary for the signalling operation has elapsed.

If, on the other hand, a vehicle passes the "double light bar" in a direction opposite to the direction of the arrow 42, only the armature of the relay 41 will be released, closing contact 46 as the relay 40 of the cell 31 is inserted in a circuit in shunt relationship to the cell 31, in such a manner that biasing resistance variations of this cell will have no effect on the relay. Therefore, the armature of the relay 40 cannot be released when the cell 31 is darkened, and a vehicle travelling in this direction exerts practically no influence on the apparatus. By using suitable time delay relays 40 and 41, it may easily be obtained that no false control actions take place, in case that the light beam falling upon cell 32 is released earlier than the beam falling upon the cell 31.

In order to obtain a response selective as to direction, as well as to the kind of vehicle, the arrangement is preferably made in such a manner that, in order to effect a response, not only both light bars have to be interrupted in a definite succession, but that, furthermore, they are simultaneously interrupted during a short period. Connections of this kind have been illustrated in Figures 9 and 10, of which Figure 10 has the further important advantage that it operates completely without inertia, in such a manner that the two light bars may be arranged at a very small distance from each other. This, furthermore, makes it possible to construct the entire apparatus in a very compact form.

Figure 9:
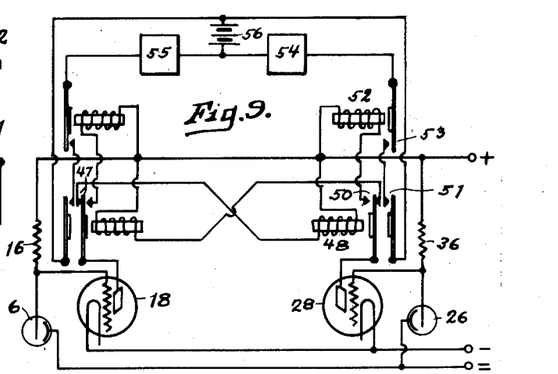
Figures 9 and 10 are further modifications of our invention, showing circuit diagrams for counting devices of different size.

Referring to Figure 9, the electron tubes 18 and 28 are controlled by the photo-electric cells 6 and 26, placed in series with resistances 16 and 36 respectively, in such a manner that the tubes become choked during the illumination of the photo-electric cells. If the cell 6 is darkened first, an electron current in the cooperating tube 18 is established, exciting across contact 47 the relay 48, which closes the contact 50. Simultaneously, contact 51 is closed and if there now follows a darkening of the cell 26 and if, accordingly, the electron current of tube 28 is established, the relay 52 will be excited, closing its contact 53. This results in the response of relay 54, supplied by the battery 56. The relay 54 serves to perform the desired final release. If the cells 6 and 26 are again exposed in succession to the illumination, all the relay armatures are released, successively returning to their positions of rest and the apparatus will again be ready for a renewed operation.

If, on the other hand, the photo-electric cell 26 is first darkened, the operation—as may readily be followed from the complete symmetric structure of the system—will take place symmetrically in a reverse sense, so that, in this case, the relay 55 will be made to respond. According to this arrangement, a different release takes place, dependent on which of both cells is first darkened, whereby, however, the advantage is gained, as compared to Figure 7, that a release takes place only when both light bars are simultaneously shut off during a short period; that is, when a vehicle and not, for instance, a pedestrian is passing. In order to simplify this arrangement, according to Figure 9, so that it operates in one direction only, it is merely necessary to discard the circuits and control elements associated with one of the relays 54 or 55.

Figure 10:
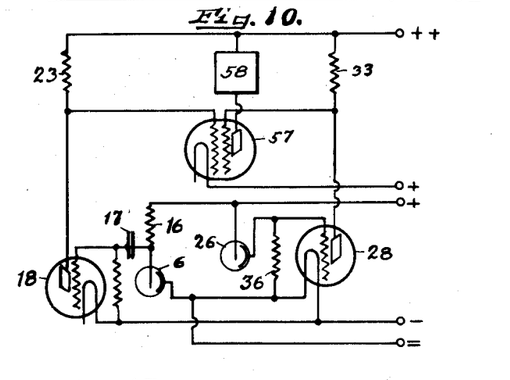

In Figure 10 we have shown a circuit which operates without parts having inertia action. It is essential in this circuit that the photo-electric cells 6 and 26 are connected in a different manner to the grids of the associated tubes 18 and 28, respectively. The action of the cell 6 upon the grid of the tube 18 is electrostatic, by means of condenser 17, the cell being connected to the negative side of the resistance 16, thus forming a voltage divider, together with the cell 6. In this connection, a choking of tube 18 takes place only when the cell 6 is again illuminated after having been darkened before.

The cell 26 is connected, in a manner similar to Figure 7, to the grid of the electron tube 28. Thus, the tube 28 will become choked as soon as the illumination of the cell 26 ceases. The tubes 18 and 28 are placed in series with resistances 23 and 33, respectively, the common points between the tubes and these resistances being connected each to one of the grids of the double grid vacuum tube 57. The anode circuit of this latter tube includes the relay 58. As soon as one of the tubes 18 or 28 is choked, the voltage drop of this tube increases and, accordingly, the potential of the corresponding grid of tube 57 connected with the anode of this tube is displaced in a positive sense. In the normal non-operative condition, or condition of rest, both grids of the tube 57 should be negatively biased in respect to the cathode, in such a manner that the tube is entirely choked, so that the anode current of the tube 57 will set in only when both tubes 18 and 28 are choked simultaneously and the potential of both grids of tube 57 displaced towards positive values.

This aim may be easily accomplished by an arrangement in which the photo-electric cell 6 is again illuminated at a moment at which the photo-electric cell 26 is still in its darkened state. This condition, however, may only prevail in an object or vehicle having a larger lengthwise dimension than the distance of the double light bars; that is, when a vehicle approaching from the left is leaving the double light bar. Thus, a selection according to size of the object (vehicle—pedestrian), as well as to direction of travel, is obtained without the use of inertia elements.

When using light bars at a comparatively small distance from each other, it has been found suitable to provide means, in addition to the inertialess operation, to insure a response of the final relay 58, even when the vehicle travels at very high speed. The operating time of this final relay is determined by the time interval between the release of the light beam falling upon the cell 6 and the release of the beam falling upon cell 26. If the distance of both light beams from each other is 1.5 meters and, supposing that the vehicle travels at a speed of 100 kilometers per hour, this time interval for the operation of the end relay is about 1/20 of a second; that is, just the limit for operating a mechanical relay. In order to insure the operation with higher speeds, in accordance with the invention, means are provided by which the operation of the end relay 58 is accomplished, not directly by a vacuum tube circuit, but through a discharge device arrangement operating without inertia and returning to its resting position after a certain time has lapsed. A number of such connections may be used, of which the so-called "spill-over" circuits give the most satisfactory results. Two embodiments of such a system are shown by Figures 11 and 12, of which the former represents a "spill-over" circuit, as referred to.

Figure 11:
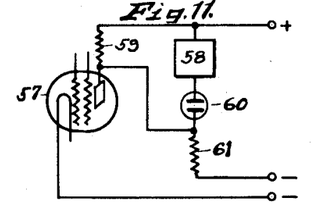
Figures 11 and 12 are circuit diagrams showing an embodiment of our invention for counting the speed of movement of devices.

According to Figure 11, the double grid tube 57, which is supposed to be connected in an arrangement according to Figure 10, is placed in series with a resistance 59. A glow discharge lamp 60 is arranged in parallel to this resistance and in series with the relay 58. As soon as a current impulse passes through the tube 57 and the resistance 59, the discharge device 60 ignites, bringing about a response of relay 58. The length of the impulse passing the tube 57 is of no influence, as the glow discharge device 60, having once been ignited across resistance 61, will continue to carry its current and will only be extinguished if, after response of relay 58, this latter, or a secondary relay, interrupts the circuit for a short moment. The response of the relay 58, even when having a high inertia, is thus insured.

Figure 12:
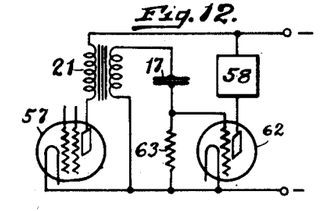

A basically different circuit is shown by Figure 12. The primary of a transformer 21 is placed in series with the double grid tube 57, the secondary acting across condenser 17 upon the grid of a single grid tube 62 placed in series with the relay 58. The tube 62 is choked on account of electron accumulation upon its grid, irrespective of the length of the original impulse through tube 57 and relay 58, which, in this case, is a closed circuit relay, will be actuated. The time during which the choking action of the tube 62 is maintained depends exclusively on the dimension of the grid leak 63 of tube 62 and may be easily adjusted to from a fraction of a second up to several minutes. If the apparatus is to be used for operating a warning signal at a street crossing, the relay 58 in the present case may directly perform a final release. The warning signal will then be maintained as long as tube 62 is in its choking condition. It is of primary importance that by further impulses, which are produced during the choking period by succeeding vehicles, the choking period is automatically prolonged, so that it is the last impulse that determines the beginning of the predetermined choking period.

As pointed out, Figure 10 constitutes a simplified example which operates only when a vehicle is passing in a definite direction. If this arrangement should be used for both directions, according to Figure 9, without, however, the use of inertia elements, this could be accomplished by the employment of two photo-electric cells, one for each of the light bars. However, in accordance with the invention, two other ways of accomplishing this aim are preferred. The first of these consists in that each of both photo-electric cells controls the grid potential of two electron tubes, whereby one of these tubes is, furthermore, subject to the influence of the photo-electric current of the other cell. The second way consists in that both cells are simultaneously illuminated by both light beams. Both of these ways will result in a considerable simplification of the circuit.

Figure 13:
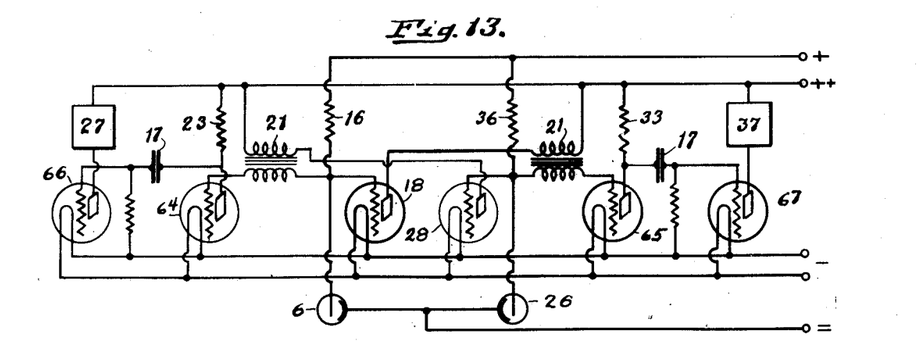
Figure 13 is a modified form of the circuit diagram shown in Figure 9.

Figure 13 illustrates a circuit of the former kind. The photo-electric cells 6 and 26 are placed in series with resistances 16 and 36, in a way already described and control the grid potentials of the vacuum tubes 18 and 28, respectively, in the same manner as according to the prior exemplifications. Simultaneously, each of the photo-electric cells controls the grid tubes 64 and 65, respectively. These latter tubes are, furthermore, subjected, by means of transformers 21, to the influence of the anode current of the tubes 18 and 28, respectively, in such a manner that each of the tubes, having its grid bias controlled by one of the photo-electric cells, is controlled indirectly by the other photo-electric cell across its grid transformer. The tubes 64 and 65 are placed in series with resistances 23 and 33 and, in a similar manner, as according to Figure 12, act across condensers 17 upon the tubes 66 and 67, the latter being placed in series each with a relay 27 and 37, respectively. The operation of this connection is somewhat similar to the one according to Figure 10, insofar as a release takes place only if one of the cells is reilluminated at a moment at which the other cell is still in its darkened state. The operation is as follows: If a vehicle approaches from the left, first the cell 6 and then the cell 26 will be darkened. Thus, the grids of the four tubes 18, 64, 28 and 65, having been blocked before, will become positive, in such a manner that an electron current through these tubes is established. If then the cell 6 is reilluminated, the tubes 18 and 64 again become blocked and the impulse is transmitted upon the tube 65 across the right hand transformer 21, connected in series with the tube 18, whereby a short decrease of the anode current of tube 65 takes place, producing a permanent choking of the tube 67 across condenser 17, in accordance with the operation of the circuit of Figure 12. In this way, the open current relay 37 operates. If, immediately afterwards, the photo-electric cell 26 becomes reilluminated, the impulse occurring in the circuit of the electron tube 28 no longer exerts an influence upon the tube 64, as this latter has been again choked completely by the preceding reillumination of the cell 6. Tube 66 and, accordingly, relay 27, thus remain uninfluenced.

As the circuit, as just described, is completely symmetrical, it is readily understood that a vehicle passing from the right to the left will produce exactly the reverse operation; that is, relay 27 will be made to respond and relay 37 remains uninfluenced. With such a circuit too, all the advantages, as pointed out in connection with Figure 12, are secured, which make the control of the end relay of the capacitatively choked vacuum tubes especially suitable for the present purpose.

Figure 14:
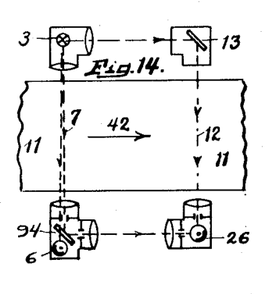
Figure 14 illustrates a double light bar system, in which the illumination of one of the cells is produced by both light bars.

Figure 14 illustrates a double light bar system, in which the illumination of one of the cells is produced by both light bars. The beam transmitted by the lamp 3 is directed in the form of two light bars 7 and 12 across the road 11 and arranged to impinge upon the cells 6 and 26. The direct beam 7, however, does not fall directly upon the cell 6, but is reflected partly by means of a semi-transparent reflector or mirror 94, with about ½ of its energy upon the cell 26. Thus, the cell 26 will be completely darkened only when both bars 7 and 12 are simultaneously interrupted, whereas the cell 6 will become completely darkened with the light bar 7 alone being interrupted. This different valence of the light bars 7 and 12 considerably simplifies the arrangement of the cells 6 and 26 and the circuit connection, as may be seen from Figure 15.

According to this latter figure, the two photo-electric cells 6 and 26 are arranged in a circuit according to Figure 5 and associated with electron tubes 18 and 28, respectively. The reference numbers of these figures correspond with those according to Figure 5. In such a connection, as described in connection with Figure 5, a choking action of the vacuum tube takes place only when a cell is completely darkened and an intermittent glow discharge maintained. The grid leak resistances 70 and 71 in Figure 15 have such dimensions that the choking action is maintained for about ⅕ of a second. The anode circuits of the tubes 18 and 28 include the windings of a differential relay 68 with delayed action, whereas the closed current relay 69 is inserted in a branch common to both anode circuits. The operation of this circuit is as follows: If a vehicle travels in the direction of the arrow 42 on the road 11, at first the light beam 7 will be interrupted and, accordingly, a choking of the tube 18 will be effected by the glow discharge occurring in the completely darkened cell 6. The illumination of the cell 26 is, however, only weakened to a certain extent. Thus, at first, the differential relay 68 will respond, whereas the closed circuit relay 69 is supplied from the tube 28, thus holding its armature. If then the light bar 12 also becomes interrupted, the cell 26 will also be completely darkened and the tube 28 choked, providing that, simultaneously, the light bar 7 remains blocked, or, in other words, providing that an object of definite dimension, such as a vehicle, is passing and no other smaller object, such as, for instance, a person, so that the open current relay 69 will be operated.

Figure 15:
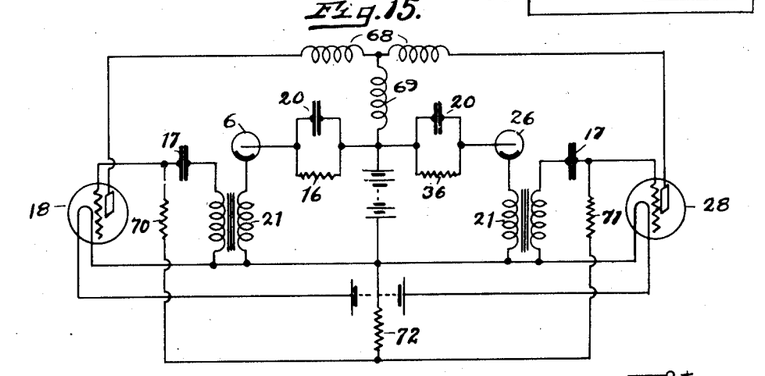
Figure 15 is a diagram showing the means applied to a system such as disclosed in Figure 14.

Conditions will be quite different when the vehicle travels in a direction opposite to the arrow 42. In this case, again presuming that the vehicle is of such size as to simultaneously interrupt both light bars during a short interval of time—both of the tubes 18 and 28 will become choked simultaneously at the moment when, after interruption of the light bar 12, bar 7 also becomes interrupted. Thus, the differential relay 68 remains in its resting position, whereas the open current relay 69 operates. The operation may be summarized as follows:—

1. Supposing a person crosses the bar 7, this will result in response of the differential relay 68, leaving the closed circuit relay 69 uninfluenced. When the person crosses the bar 12, nothing at all happens.

2. Assuming a vehicle approaches from the left, first the differential relay 68 and, consecutively, the closed circuit relay 69 will operate.

3. Assuming a vehicle approaches from the right, only the closed circuit relay 69 responds.

The closed circuit relay 69 thus operates selectively as to the size of the object (vehicle—person) and the differential relay effects a selection as to direction of travel and it is apparent that by, for instance, connecting the secondaries of the relays 68 and 69 in series, different final releases may be effected, dependent on whether a vehicle is approaching from the right, or from the left. This, therefore, performs the same results, but with considerably simpler means, as compared to the circuits according to Figures 9 and 13, or a double light bar arrangement comprising two arrangements, according to Figure 10. The shortcoming that only short periods are available for the operation of the differential relay 68 may be overcome in that a differential transformer is substituted for the differential relay, having a secondary connected in a circuit, as described by, or similar to Figures 11 and 12. As to the relay 69, there is always sufficient time available for the response of this relay, as a choking action of the tubes 18 and 19 prevails over a certain period after having once been started. In order to insure the simultaneous suspension of the choking of the tubes 18 and 28 at the same instant and, accordingly, preventing the differential relay 68, or an equivalent circuit, as referred to above, from responding reiteratively, both grid leak resistances 70 and 71 are connected to the heating circuit in series with a high resistance 72.

We have found that this double light bar arrangement, according to our invention, is well suited for measuring the velocity of the vehicle. To this end, it is merely necessary to provide a device which marks the reciprocal value of the time interval between the crossing of the first and of the second light bar. The present arrangement thereby has a special advantage, in that, on account of its inertialess operation, the light bars may have a rather short distance from each other, without impairing the accuracy of the measurement.

In movable equipment, which are desired primarily for this purpose, difficulty in measuring the velocity has been met with, in that it is not always possible to secure practically the distance at which the apparatus has originally been calibrated. This difficulty, according to our invention, may be overcome, in that an element determining the time constant of the measuring arrangement is so designed that it may be readjusted to correspond to any particular distance of the light bars. In this manner, the accuracy of the measurement, even with varying distance of the light bars, is insured.

If it is desired to directly read the velocity, this may preferably be carried out by means of a pointer, which, during the time between the crossing of the first and the second light bars, moves over a scale from the higher to the lower values, calibrated in advance in velocity values. In order to prevent the recording of pedestrians, or also of vehicles traveling below a pre-determined minimum speed, such as, for instance, hand wagons, it was found suitable to return the measuring device automatically in its zero or resting position, by well-known means, such as maximum contacts, in case that the second light bar is not interrupted within a predetermined period after the crossing of the first light bar.

For the purpose of traffic statistics, in accordance with our invention, the measuring device is connected to a contact mechanism performing a registration, or producing a signal, such as a warning signal, whenever the crossing of the second light bar takes place within a pre-determined definite minimum time after the crossing of the first light bar.

Figure 16:
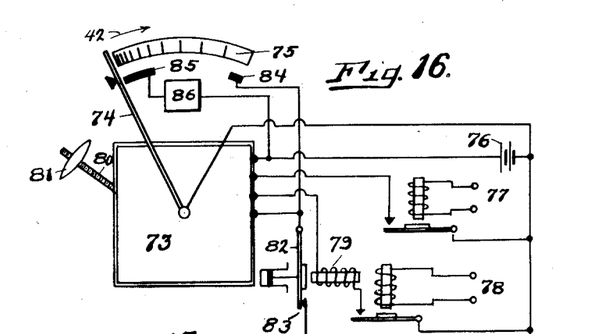
Figure 16 is a diagrammatic showing of the indicator used for measuring the speed of devices.
Figure 17:
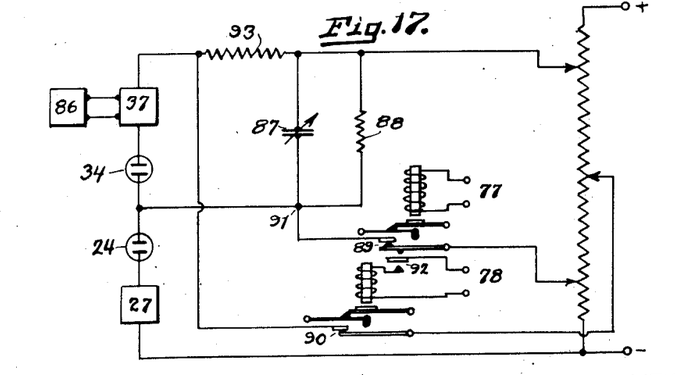
Figure 17 illustrates an arrangement which operates without the use of intermediate relays.

Two such circuits, solving all the afore-mentioned objects and being based on different principles of time measurement, are shown by Figures 16 and 17.

Referring to Figure 16, we have shown a time measuring mechanism 73, having a pointer 74 moving in the direction of the arrow 42, from higher to lower values, over a scale 75 calibrated, for instance, according to velocity, in kilometers per hour. The time measuring device 73 is provided with electric control means (not illustrated), which are supplied from a battery 76. Whenever the relay 77 operates, the time measuring device 73 is set in motion and is again arrested by the response of relay 78. With the response of the time delayed relay 79, the pointer 74 will automatically be brought back in its starting position. In order to adjust the starting velocity of the device 73 to correspond to the light bar distance, to maintain the correctness of the calibration of the scale 75, an adjustable weight 81 is provided attached to the swinging lever 80, adapted to determine the time constant of the device 73. The weight may be moved along a scale on the lever 80 directly calibrated according to the distance of the light bars. As soon as the first light bar is crossed, relay 77 operates in accordance with any one of the circuits described before, whereby the time measuring device 73 is started. If then the second light bar is crossed and, accordingly, relay 78 actuated, the device 73 is again brought to rest. In this way, the relay winding 79 is excited, operating a drop lever pressing against the pointer 74. At the same time, the coil 79 attracts the relay armature 82. This armature is provided with an air damping arrangement, to secure a delayed action, in such a manner that it follows the pull of the magnetic coil 79, only slowly and closes the contact 83, only after the release of the drop lever, whereby the pointer 74 is brought back into its starting position. If the second impulse operating the relay 78 is too late so that the pointer 74 reaches the contact 84 at an earlier moment, or if this impulse does not occur, the contact 83 is bridged upon advancing pointer 74, making contact with the contact strip 84 and a resetting of the pointer 74 into its starting position takes place.

If the speed of the vehicle exceeds a certain maximum value, the pointer 74 comes in contact with the contact strip 85 as soon as it is pressed down by the drop lever after the time measuring mechanism has been stopped, whereby relay 86 is put under current operating an alarm signal or recording the excess velocity.

Figure 17 illustrates an arrangement which operates without the use of intermediate relays and which uses only opening contacts and is, therefore, adapted for light bars, being arranged very close to each other. The principle of time measurement underlying this arrangement consists in that the voltage of a charged condenser decreases the more the longer a resistance of given value is connected in parallel. The voltage loss taking place within a definite time period may be used as a means for measuring such a time interval, whereby the change in voltage is measured. In the present case, it was found suitable to use a "spill-over" circuit for ascertaining the charging condition of this condenser. One of the simplest of these "spill-over" circuits consists in a glow discharge lamp, being connected in series with the condenser, which lamp ignites as soon as its threshold value (ignition potential) is exceeded. The circuit according to Figure 17 uses two such glow discharge lamps 24 and 34. Relay 27 is connected in series with the discharge device 24 and relay 37 is in series with the discharge device 34. The variable condenser 87 serves as a measuring capacity, a high ohmic resistance 88 being connected in parallel. By properly adjusting the condenser 87, the time constant of the measuring system comprised by the condenser and the resistance is varied in a way analogous to the time constant of the time measuring device 73, in accordance with Figure 16, which may be adjusted by means of the displacement of the weight 81. The relays 77 and 78, whose contacts 89 and 90 are closed in their resting position, are operated by any one of the afore-mentioned photo-electric means, relay 77 being excited with the crossing of the first and relay 78 being excited with the crossing of the second light bar. When the first relay 77 is excited and, accordingly, contact 89 opened, the contact 92 and, accordingly, the circuit of the relay 78, are closed. Both relays 77 and 78 are constructed as drop relays, or the like and will be brought into their resting position as soon as the final relays 27 and 37 operate.

The operation of the circuit is as follows: In the resting position, the ignition point 91 carries a potential which may be varied by varying the tap point on the potentiometer connected to the contact 89. This potential is so low that ignition of the glow lamp 24 cannot take place by any means, whereas the potential difference in respect to the positive pole is such that the glow discharge device 34 will ignite instantaneously whenever the potential applied to it is not artificially lowered by the contact 90. As soon as the relay 77 is excited and, accordingly, contact 89 opened, the condenser 87 begins to discharge across the high resistance 88. If the time period between the crossing of the first and second light bar is long, the discharge of the condenser 87 is such that the lamp 24 ignites. Thus, the relay 27 is actuated, returning the apparatus into its resting position and simultaneously opening the contact 92. An ensuing impulse upon the relay 78 will thus be uninfluenced.

If, however, the relay 78 is actuated shortly after the relay 77, the glow discharge lamp 34 ignites as, with the opening of the contact 90, it receives the full voltage across the resistance 93 and as, with short discharge periods, the condenser 87 has not yet lost sufficient voltage to decrease its potential below the ignition potential of the glow discharge lamp 34. When the glow discharge lamp 34 ignites, the relay 37 responds and operates registering or signalling device 86, thus marking excess speed of the vehicle. At the same time, relay 37 operates to return relays 77 and 78 into their starting position, closing contacts 89 and 90 and opening contacts 92, whereby the entire apparatus is again ready for a new operation. Such an installation, therefore, automatically indicates or registers any speed in excess of a pre-determined maximum speed and, when not producing a signal for registration, returns into its starting position, in case that the mentioned limit speed has not been exceeded. In order to insure an operation completely free from inertia, electronic tubes may be substituted for the relays 77 and 78, as has been repeatedly described, which tubes, in accordance with the operation according to Figure 12, are choked with the crossing of the light bars and operate in the same manner as contacts having been interrupted.

Although the invention has been described with reference to the specific examples shown in the drawings, it is obvious that the novel technical ideas allow many modifications and combinations, without departing from the broader principle, such as train control and any other form of signalling. Accordingly, we wish it to be understood that the specification and drawings should be illustrative only of the broader principles underlying the invention and as are expressed in the ensuing claims.

What we claim is:—

1. A control system operated by moving objects, comprising a pair of photoelectric devices; means for impinging a controlling light beam upon each of said devices, said devices being spaced from each other at a distance less than the dimension of said objects in the direction of their movement; a pair of electronic relays each having main electrodes and a control electrode; control and output circuits connected to said relays, each of said devices being connected to the control circuit of one of said relays; a pair of translating devices each controlled by the output of one of said relays; means for normally biasing said control electrodes to substantially prevent current flow through said relays when said devices are illuminated by said light beams; and mutual reacting circuit connections from each of said relays to the control circuit of the other relay whereby after simultaneous obscuration of both said devices by an object passing the devices in a predetermined direction the interruption of the output current in the relay associated with the device first re-illuminated by the passing object causes a reaction upon the relay controlled by the other of said devices still being obscured by the passing object adapted to produce a resultant output current variation in the last mentioned relay sufficient to operate the translating device controlled by the last mentioned relay.

2. In a control system as claimed in claim 1 in which each of said reacting circuit connections includes an additional electronic relay, each having its control circuit connected to the control circuit of one of said first mentioned electronic relays, and an inductive coupling device between each of the output circuits of said auxiliary relays and the input circuit of the other of said first mentioned electronic relays.

3. A control system operated by moving objects, comprising a pair of current control devices adapted to be controlled by a passing object, said devices being spaced from each other at a distance less than the dimension of said objects in the direction of their movement; a pair of electronic relays each having main electrodes and a control electrode; a pair of translating devices each controlled by the output of one of said relays; means comprising circuit connections to said control electrodes each including one of said devices for normally biasing said control electrodes to substantially prevent current flow through said relays when said devices are not under the influence of a passing object; and mutual reacting circuit connections from each of said relays to the control circuit of the other relay whereby after simultaneous control of both of said devices by an object passing in a predetermined direction the interruption of the output current in the relay associated with the device first released from control influence by the passing object causes a reaction upon the relay controlled by the other of said devices still under control influence by the passing object adapted to effect an additional output current variation in the last mentioned relay sufficient to operate the translating device controlled by said last mentioned relay.

4. A control system operated by moving objects, comprising a pair of current control devices adapted to be controlled by a passing object, said devices being spaced from each other at a distance less than the dimension of said objects in the direction of their movement; a pair of electronic relays each having main electrodes and a control electrode; a pair of translating devices each controlled by the output of one of said relays; means comprising circuit connections to said control electrodes each including one of said devices for normally applying a predetermined bias to said control electrodes when said devices are not subjected to the controlling influence by a passing object; and mutual reacting circuit connections from each of said relays to the control circuit of the other relay whereby after simultaneous control of both of said devices by an object passing in a predetermined direction and removal of said bias the variation of the output current of the relay connected to the device first released from the controlling influence by the passing object causes a reaction upon the relay controlled by the other of said devices still under controlling influence by the passing object adapted to effect an additional output current variation in said last mentioned relay sufficient to operate the translating device controlled by the output of said last mentioned relay.

5. A control system operated by moving objects, comprising a first photoelectric device; a second photoelectric device; means for impinging controlling light beams upon said devices, said devices being spaced from each other at a predetermined distance to cause simultaneous obscuration by a passing object of predetermined size; a first control circuit associated with said first photoelectric device; a second control circuit associated with said second photoelectric device; an electronic relay, said relay having main electrodes and a control electrode and being controlled by said second photoelectric device when obscured by a passing object; a translating device controlled by said second electronic relay; and a circuit connection between the input circuit of said second electronic relay and said first control circuit for applying an additional control potential to said second electronic relay by a current variation in said first control circuit caused by re-illumination of said first photoelectric device after simultaneous obscuration of both of said photoelectric devices by a passing object and while said second photoelectric device is still obscured by the passing object, the resultant current variation of said second relay being adapted to operate said translating device.

HEINRICH H. GEFFCKEN.
HANS R. RICHTER.